US005619587A

United States Patent [19]
Willoughby, Jr. et al.

[11] Patent Number: 5,619,587
[45] Date of Patent: Apr. 8, 1997

[54] SYSTEM AND METHOD FOR CONTACTLESSLY GAUGING THE THICKNESS OF A CONTOURED OBJECT, SUCH AS A VEHICLE WHEEL

[75] Inventors: Louis G. Willoughby, Jr., Bay Village; Donald G. Jordan, Willoughby, both of Ohio; Paul R. Adomaitis, Trafford, Pa.; Avraham C. Goldman, South Euclid, Ohio; Anthony J. Tomasello, Schaumburg, Ill.; Steve Montellese, Ross Township, Allegheny County, Pa.; Edward W. Weed, Upper St. Clair, Pa.; Abraham Shtrahman, O'Hara Township, Allegheny County, Pa.

[73] Assignee: Aluminum Company of America, Pittsburgh, Pa.

[21] Appl. No.: 166,891

[22] Filed: Dec. 15, 1993

(Under 37 CFR 1.47)

Related U.S. Application Data

[63] Continuation of Ser. No. 739,058, Jan. 2, 1992, abandoned, which is a continuation-in-part of Ser. No. 698,754, May 10, 1991, abandoned.

[51] Int. Cl.⁶ ................................................. G06K 9/00
[52] U.S. Cl. ....................... 382/141; 356/384; 382/286
[58] Field of Search .................................. 382/141, 152, 382/286, 291; 356/376, 377, 384; 348/92, 94, 86, 125; 250/500, 502; 364/474.16, 552

[56] References Cited

U.S. PATENT DOCUMENTS

| | | | |
|---|---|---|---|
| 4,201,476 | 5/1980 | Musto et al. | 356/386 |
| 4,204,434 | 5/1980 | Whitsel | 73/622 |
| 4,432,648 | 2/1984 | Musto et al. | 356/387 |
| 4,449,226 | 5/1984 | Collmann | 378/58 |
| 4,476,533 | 10/1984 | Daudt et al. | 364/473 |
| 4,576,482 | 3/1986 | Pryor | 356/376 |
| 4,674,869 | 6/1987 | Pryor et al. | 356/1 |
| 4,679,447 | 7/1987 | Sieradzki et al. | 73/865 |
| 4,695,163 | 9/1987 | Schachar | 356/369 |
| 4,791,482 | 12/1988 | Barry et al. | 356/376 |
| 4,798,469 | 1/1989 | Burke | 356/376 |
| 4,798,964 | 1/1989 | Schmalfuss et al. | 250/560 |
| 4,801,207 | 1/1989 | Williams | 358/101 |
| 4,803,645 | 2/1989 | Ohtomo et al. | 364/560 |
| 4,806,777 | 2/1989 | Ulbers et al. | 250/560 |
| 4,872,757 | 10/1989 | Cormack et al. | 356/376 |
| 4,894,551 | 1/1990 | Kishimoto et al. | 250/560 |
| 4,929,843 | 5/1990 | Chmielowski, Jr. | 250/561 |
| 4,937,445 | 6/1990 | Leong et al. | 250/237 |
| 4,964,770 | 10/1990 | Steinbichler | 433/223 |
| 4,982,103 | 1/1991 | Meiffren | 250/560 |
| 4,982,438 | 1/1991 | Usami et al. | 382/25 |
| 4,989,984 | 2/1991 | Salinger | 356/445 |
| 4,993,836 | 2/1991 | Furuhashi et al. | 356/376 |
| 5,003,187 | 3/1991 | Zumbrunn et al. | 250/560 |

*Primary Examiner*—Joseph Mancuso
*Attorney, Agent, or Firm*—Webb, Ziesenheim, Bruening, Logsdon, Orkin & Hanson, P.C.; Gary P. Topolosky

[57] ABSTRACT

There is disclosed a system for visually measuring the cross-sectional thickness of a light-reflective object, such as a vehicle wheel, said object having a plurality of curved surfaces. The system includes: means for transmitting a line of light onto each curved surface of the object at substantially the same cross-sectional area through the object; means for sensing the lines of light reflected from each curved surface and producing a plurality of signals thereby, said signals representing a linear profile of each curved surface at the same cross-sectional area; and means for comparing the profile signals from each curved surface for calculating a cross-sectional thickness of the object at one or more points along the same cross-sectional area. On a more preferred basis, this system further includes means for supporting the object, and means for rotating the object about at least one axis of support to measure a plurality of cross-sectional thicknesses thereof. Most preferably, the light transmittal means of this system include a plurality of light sources for transmitting collimated laser lines across the object's inner curved surfaces from opposite sides of the object substantially simultaneously. A method for inspecting a vehicle wheel to determine whether it is within dimensional specification is also disclosed. This method employs a system substantially as set forth above.

56 Claims, 8 Drawing Sheets

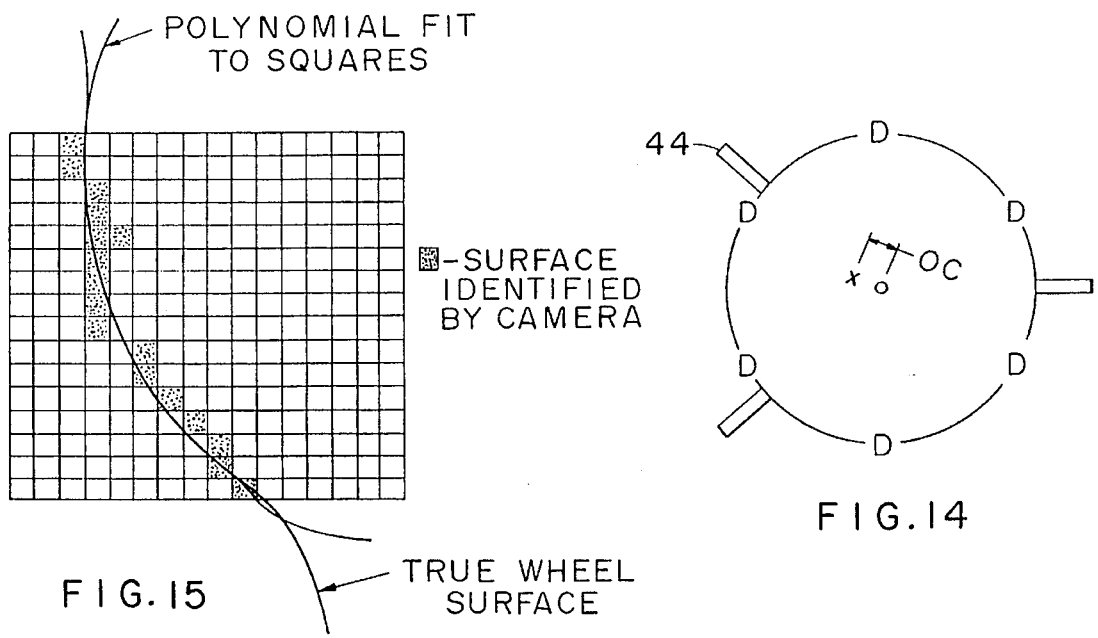
FIG.15
FIG.14
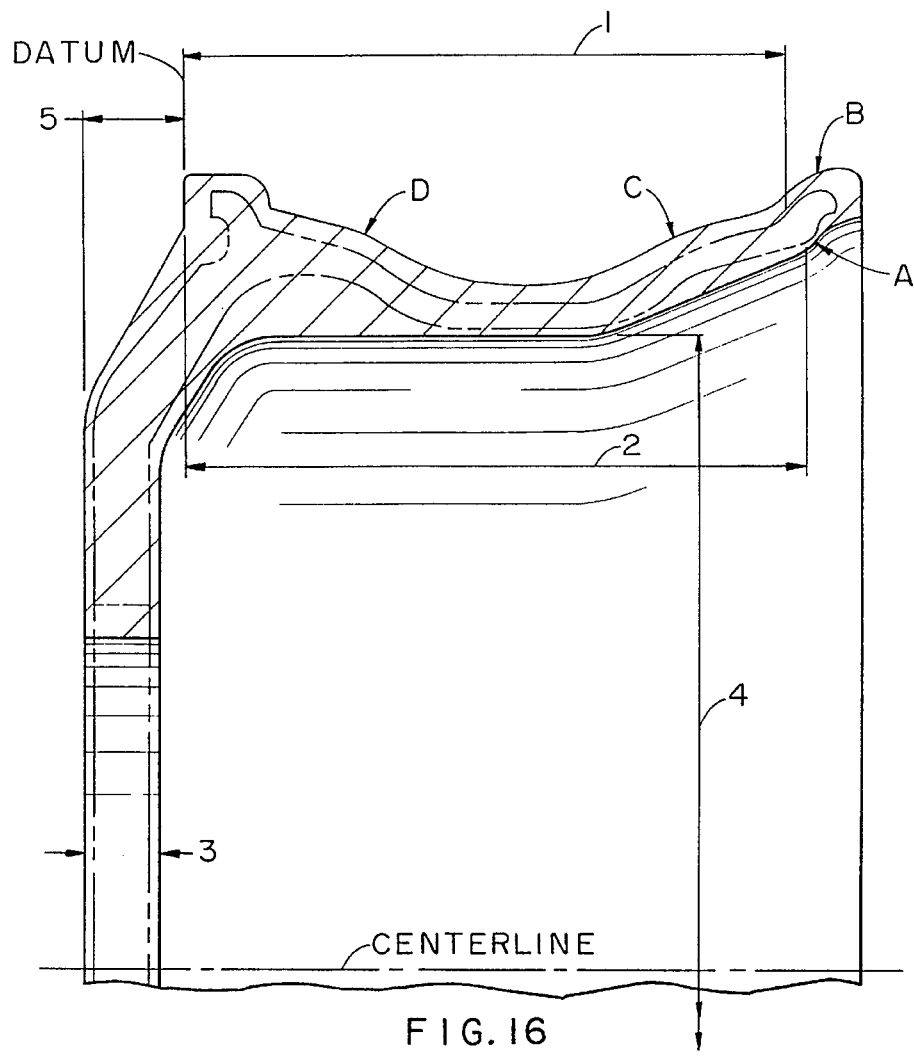
FIG.16

SYSTEM AND METHOD FOR CONTACTLESSLY GAUGING THE THICKNESS OF A CONTOURED OBJECT, SUCH AS A VEHICLE WHEEL

This is a continuation of application Ser. No. 07/739,058 filed on Jan. 2, 1992 now abandoned which is a continuation-in-part of application Ser. No. 07/698,754, filed on May 10, 1991, now abandoned for file wrapper continuation Ser. No. 08/027,616, the disclosure of which is fully incorporated herein by reference.

BACKGROUND OF THE INVENTION

1. Field Of The Invention

This invention relates to vision or non-contact inspection devices and, more particularly, to systems and methods for gauging the thickness and dimensions of a contoured object having complex shapes.

2. Brief Description of The Prior Art

A known method of manufacturing vehicle wheels from metal, such as aluminum, involves hot forging of the metal into a roughly sized and shaped wheel. This forging can include one or more operations in which a portion of an aluminum billet or other pre-form is compressed under extreme temperatures and pressure against particularly shaped forming dies to form the object. The forged wheels are thereafter machined to final dimensions.

It is essential that the forged wheel have sufficient material in all of a variety of critical locations, and be of the proper size and shape, in order to conduct the final machining process for the finished wheel. It is not uncommon during the machining process to discover that there is not enough material on the forged wheel to cut away for the finished wheel. At that point, the wheel must be scrapped, losing not only the material used to make the forged wheel, but also losing the time and expense to transport the forged wheel to the finishing facility and to perform the finishing process on the forged wheel. Furthermore, such defects in one forged wheel are often not an isolated incident and may indicate problems in the forging process, such as with the dies which could result in defects in other wheels produced from the same forge at about the same time.

It is a common practice today in manufacturing forged aluminum wheels to periodically conduct process/product statistical inspections on the forged wheels prior to machining. These inspections are conducted by calipers and other hand held, contact gauging equipment. Therefore, it is necessary that the forged wheels be permitted a sufficient time to cool so that they may be handled by the inspectors. In addition, the present methods of gauging and inspecting these wheels by hand is a tedious task and, as a result, the total turnaround time for gauging a single wheel may be upwards of 3 to 4 hours. If an inspection conducted 3 or 4 hours after the forging discovers a problem with the forging process itself, then several hours worth of production on forged wheels may be scrapped. In addition, conducting spot hand checks on a small sample of the produced wheels cannot readily detect trends which may indicate that a problem is developing in some aspect of the forging process.

It is known in the art to use non-contact means to acquire data about the shape and dimensions of an object. Such non-contact means typically include an illumination source and a light sensitive detector. A light source is used to highlight the overall surface or a select area of the object, or is used as a backlight to obtain a profile. The sensor collects the reflected and/or transmitted light and provides data that is analyzed, compared against a reference, and displayed as a video image or the like.

U.S. Pat. Nos. 4,449,226, 4,798,964 and, 4,679,447 disclose non-contact arrangements for gauging and inspecting the outer surface of wheels. U.S. Pat. No. 4,204,434 discloses a system for ultrasonic testing of welds in wheels. Other non-contact arrangements for inspecting and/or gauging the outer surface and dimensions of objects include U.S. Pat. Nos. 4,674,869, 4,695,163, 4,798,469, 4,803,645, 4,806,777, 4,929,843, 4,982,103, 4,989,984, 4,476,533, 4,576,482, 4,937,445, 5,003,187, 4,964,770, 4,894,551, 4,982,438, 4,872,757 and 4,993,836.

Vehicle wheels, whether the forged preform or the final finished wheel, have critical dimensions both on the inner and outer surfaces and also critical thicknesses that must be maintained in various locations on the wheel. None of the previously known non-contact means for inspecting objects are capable of performing such an inspection on both the inside and outside surfaces of objects such as vehicle wheels, and are also not capable of producing, in a non-destructive manner, cross sectional information on the object under test. Therefore, it is an object of the present invention to provide a system and method for a non-contact video measurement of a generally cylindrical object, such as a vehicle wheel having a plurality of inner and outer curved surfaces, regardless of the temperature of said cylindrical object. It is another object of the present invention to provide a wheel dimensional measurement system which determines the thickness of the wheel along several critical points of the wheel's inner and outer contours in order to determine whether the wheel is within dimensional specifications. It is yet another object of the present invention to provide a system and method for measuring the three dimensional thickness of an object having complexly curved inner surfaces which would not otherwise be reachable with standard, manual measuring devices, or with the light source and sensor arrangements of the prior art visual inspection systems.

It is a further object of the present invention to provide a system and method for gauging wheels which can be incorporated into an overall wheel production process. Furthermore, it is an object of the present invention to provide a real-time wheel measuring system which can inspect a recently forged wheel while the wheel is still hot from the forging process. It is also an object to provide such a wheel inspection system which can detect defects in the most recently forged product, and also detect forging press or die problems, before the defects or equipment problems result in the production of hundreds of out-of-specification wheels which would then have to be scrapped, remelted and reforged.

SUMMARY OF THE INVENTION

Accordingly, we have developed a non-contact method for measuring the shape and cross sectional dimensions of a substantially hollow cylindrical object, such as a forged aluminum vehicle wheel, having at least one open end, an inner surface and an outer surface. The object also has a longitudinal axis extending therethrough. The method includes positioning the object on a support which defines: a support longitudinal axis extending parallel to the object longitudinal axis; and a reference plane in a known location and extending perpendicular to the support longitudinal axis. A portion of the outer surface of the object is illuminated along an outer line in a first inspection plane extending perpendicular to the reference plane and through the support longitudinal axis at a first inspection position on the object. The illumination on the object is detected along the outer line and, in response thereto, a first location signal is generated representing the locations of the portion of the outer surface of the object along the outer line with respect to the support longitudinal axis and the reference plane. Similarly, a portion of the inner surface of the object is illuminated through the open end along an inner line in the first inspection plane. The illumination on the object along this inner line is detected and a second location signal representing the illuminated portion of the inner surface along the inner line is generated with respect to the support longitudinal axis and the reference plane. The first location signal and the second location signal are combined with respect to the support longitudinal axis and the reference plane, and a cross section signal is generated which represents the dimensions of at least a portion of the object between the outer surface and the inner surface at the first inspection position.

Additionally, the method can include illumination of at least a portion of an end surface of the object along an end line in the first inspection plane as well as detection of the illumination along the end line and generation of a third location signal representing the locations of the position of the end surface along the end line with respect to the support longitudinal axis and the reference plane. The third location signal is combined with the first and second location signals with respect to the support longitudinal axis and reference plane for generating the cross section signal.

The steps described above can be repeated at a plurality of inspection positions spaced about the object, such as at regular intervals. These multiple inspection positions can be provided by sequentially rotating the support about the support longitudinal axis. In addition, the method can include the further step of generating, at each inspection position, a radial signal representing the radial dimensions of at least a portion of the object with respect to the support longitudinal axis.

In order to compensate for differences between the longitudinal axis of the support and the longitudinal axis of the object undergoing inspection, the method can include the steps of selecting a radial dimension of the object at the same object location in at least three of the inspection positions, determining the radial center of an imaginary circle passing through the selected radial dimensions, determining the radial difference between the support longitudinal axis and the calculated radial center, and adjusting the location signals, cross section signals and radial signals in a vector operation which considers the magnitude and direction of the radial difference in each inspection plane.

The outer surface of the object undergoing inspection can be illuminated by a backlight spaced from and oriented substantially parallel to the inspection plane, or by a line of laser light on a less preferred basis. The inner surface of the object and the end surface of the object can be illuminated by lasers which project a line of laser light along the inner line and end line, respectively. These lasers can conveniently be Helium-Neon lasers having line generators on the output laser beams.

The illumination on the object along the various lines thereof can be detected by video cameras, such as charge coupled device cameras. The location signals can be generated by an electronic video image processor which receives the output signals of the video cameras. These video cameras typically generate a two-dimensional pixel array which represents the light intensity of the scene/object observed by the camera. The video image processor can conduct a row-by-row or column-by-column edge detection of each pixel row or column. The video image processor then calculates a precise location of the detected edge with respect to the support longitudinal axis and the reference plane. A plurality of separate pixel arrays can be averaged together for each video camera prior to evaluation by the video image processor. The video image processor can also, after it has determined which pixel in each row or column detected the illumination, use polynomial mathematical techniques to generate a precise curve through the illuminated pixels that represents the surface of the object.

Once the information on one or more wheels has been collected using the techniques described above, the system can further include steps of comparing the location signals, cross section signals and radial signals actually generated from the object with predetermined standards for the object, and then determining whether the object is within acceptable tolerances for the predetermined standards.

An apparatus for performing the method set forth above is also described herein.

BRIEF DESCRIPTION OF THE DRAWINGS

Further features, objectives and advantages of the present invention will be made clearer from the following detailed description of the preferred embodiments made with reference to the drawings in which:

FIG. 14 is a top view of a wheel showing the off center compensation techniques of the present invention;

FIG. 15 is a schematic diagram of a pixel array showing the polynomial curve fitting techniques of the present invention; and FIG. 16 is a cross section of a forged vehicle wheel showing various critical areas of the wheel with respect to a center line and the datum reference plane.

DETAILED DESCRIPTION OF THE PREFERRED EMBODIMENTS

Figure 1:
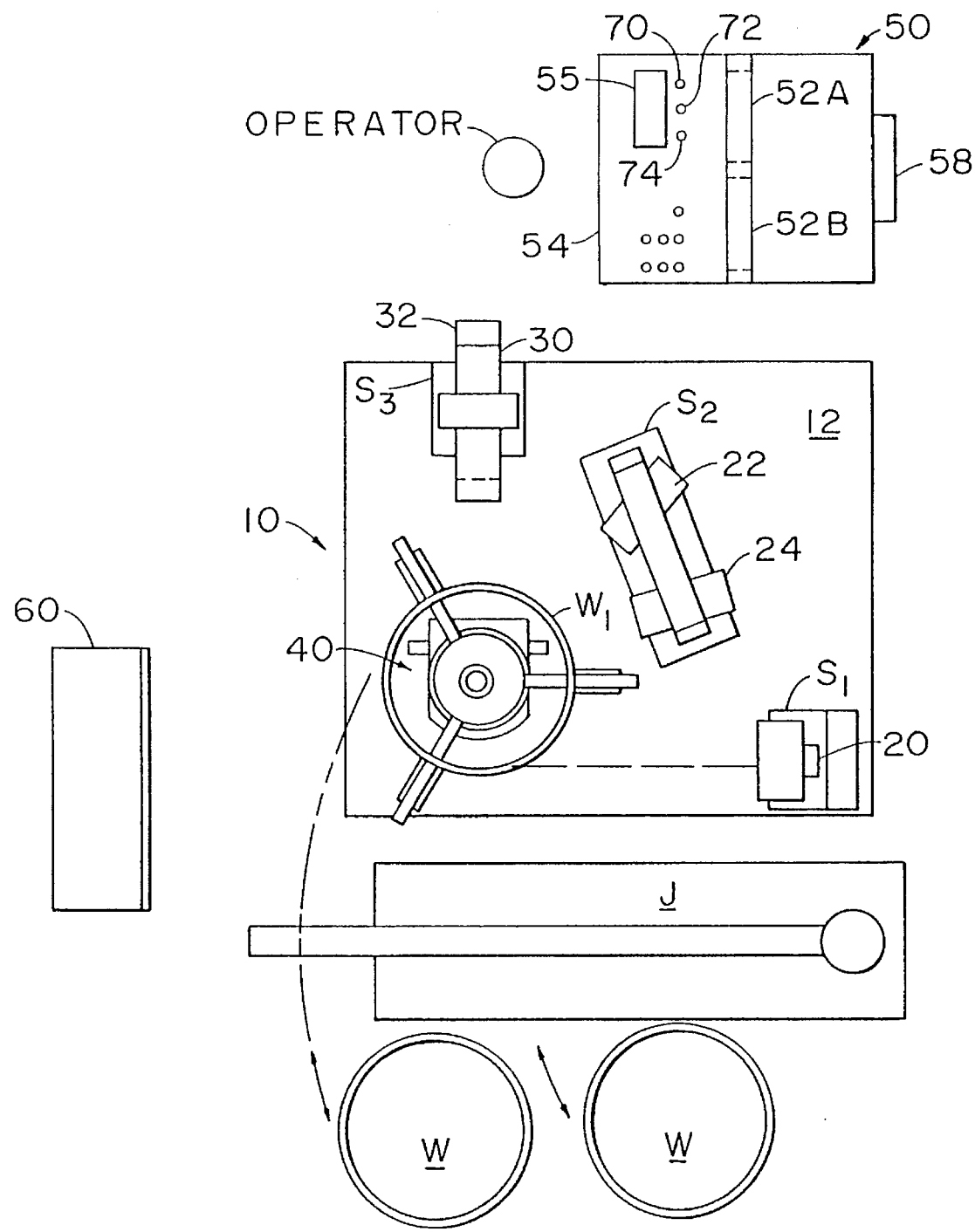
FIG. 1 is a top, plan view of one embodiment of a vision inspection system in accordance with the present invention and positioned as part of an on-line wheel forging operation.
Figure 2:
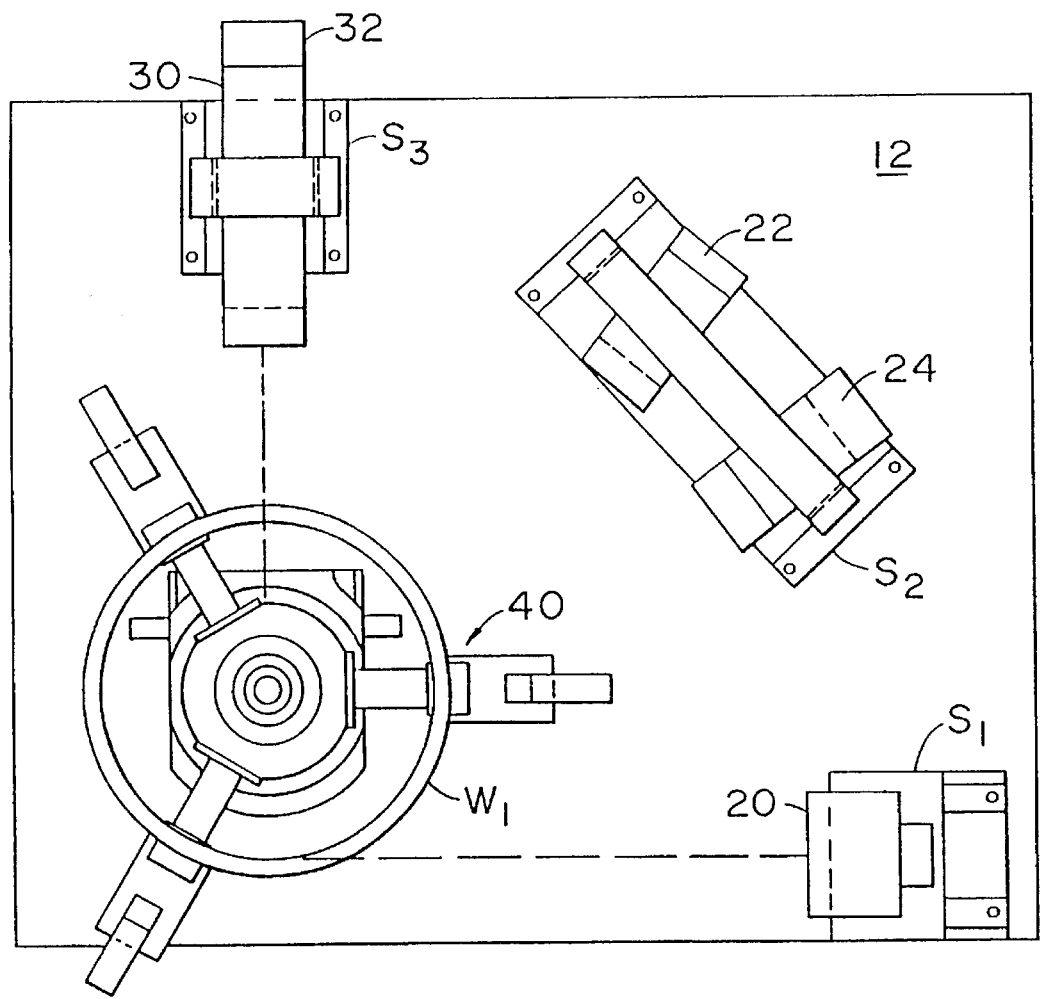
FIG. 2 is an enlarged, plan view of the platform portion of the system shown in FIG. 1.
Figure 3:
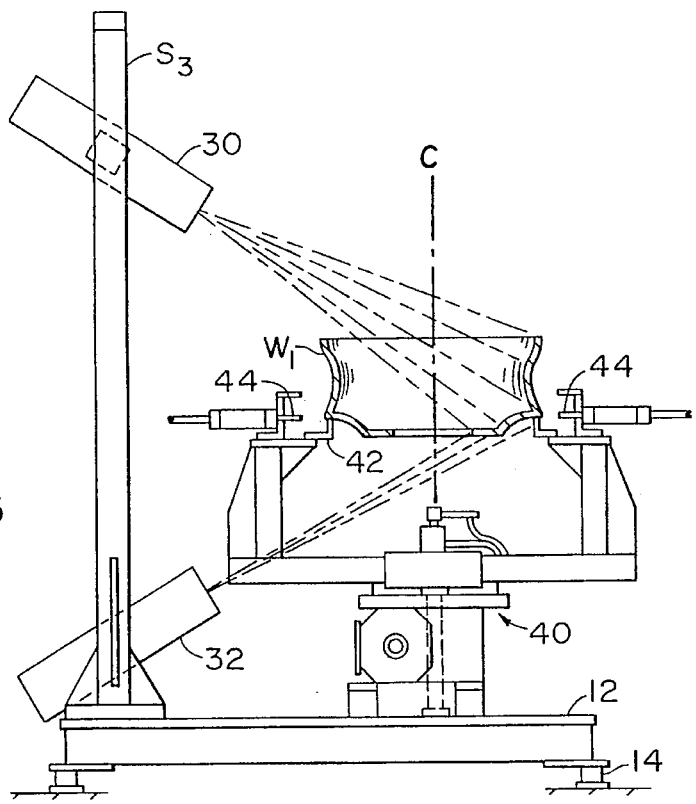
FIG. 3 is a side view of a first vehicle wheel positioned on the system's indexer, with the laser stand of the base platform also being shown.
Figure 4:
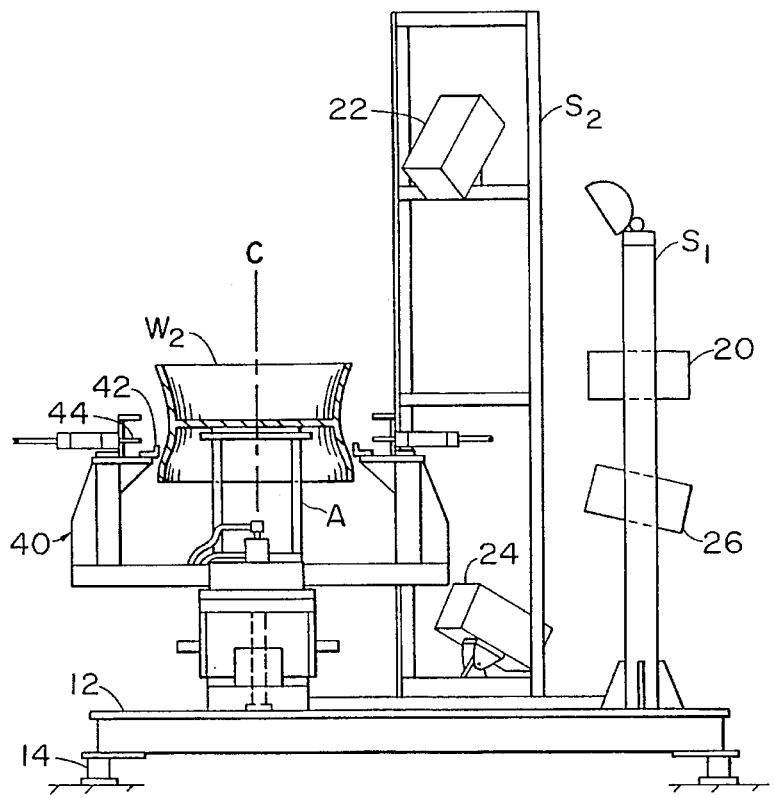
FIG. 4 is a side view of a second vehicle wheel positioned on the system's indexer, with two camera stands of the base platform also being shown.

The present invention is directed to a system and method for visually measuring or gauging, in a non-destructive manner, the cross-sectional thicknesses, diameters, and other areas of concern on a vehicle wheel such as a truck wheel, automotive wheel or aircraft wheel made from steel, aluminum, composites or the like. It is to be understood, however, that this method and apparatus for illuminating and gauging curved surfaces may be applied to measure the thicknesses and other dimensions of any cylindrical object having an open end and a plurality of inner and outer contours.

The system of this invention is designed as an on-line production means for measuring the specific radial cross-section and other dimensions of a wheel as it exits a manufacturing operation, such as a forging press, or after it is machined, tempered and/or cleaned to make a finished wheel. The system is also designed to operate off-line. In either case, the system may determine the thickness and other critical dimensions of a vehicle wheel to determine whether the wheel is suitable for further processing, especially by machining and post-forming aging or tempering. The system was also designed to store measurements and data from a plurality of wheel inspections, on hard disk storage or on floppy disks or on any other suitable media, for use in comparative, statistical analyses, long-term trend detection studies, graphical display purposes, printing, and transfer to other computer storage and software systems.

The system takes measurements from a plurality of data points acquired from the wheel's inner and outer profiles (or contours) at a plurality of positions to which the wheel is indexed for inspection at a plurality of positions. These inside and outside profiles are mathematically combined to provide an accurate cross-sectional measurement of the wheel rim in a plane containing the idealized surface normals of the wheel, i.e., the plane perpendicular to the rim surface and through the axial center of the wheel itself. Wheel diameters are generated from pairs of opposed cross-sectional radial measurements. The system is designed to employ multiple cameras, lasers, optics, filters, and lighting fixtures to maximize the capabilities of its computer vision subsystem to achieve the high resolution and dimensional accuracy given the mechanical constraints of material handling, equipment assembly and operating costs, and fixture positioning. The present invention calculates cross-sectional wheel thicknesses and other critical dimensions to within an accuracy of well below +0.05 inch. Preferred embodiments approximate cross-sectional thicknesses to within about +0.005 inch or less.

Referring now to FIGS. 1–4, there is shown one embodiment of a wheel vision inspection system in accordance with the present invention, generally 10, preferably arranged as part of an on-line wheel manufacturing process. A jib crane J or the like may be used to transport forged wheels W from a forging press, machining stand, tempering oven or other wheel holding area, and onto the indexer portion of this system.

The system includes a platform base 12 upon which a majority of the system components are mounted. The platform 12 rests on a plurality of vibration dampeners 14 which absorb the vibrations carried by the system's surrounding equipment. The system employs highly sensitive laser and light sensing equipment. It is critical that this equipment remain steady, without substantial movement in any direction, while it takes measurement readings from wheels being inspected therewith. As such, it may be necessary to employ more sophisticated vibration dampening supports beneath platform 12 depending on the system's relative position to the wheel forging press and/or other on-line production equipment.

The inspection and gauging system of this invention employs a non-contact or vision method of measuring to determine the surface of wheel rims, especially hot forged wheel rims, in three-dimensional object space. On a preferred basis, the light sensing means comprises a plurality of CCD (charge coupled device) cameras mounted within environment protective enclosures on stands attached to the platform base 12. A first camera 20 is supported on stand $S_1$, and views the profile of the outer surface of the wheel. A pair of second and third cameras 22, 24 are supported on stand $S_2$ and are directed, respectively, to the upper inner wheel surface and to the lower inner wheel surface. For some larger wheels, such as wheel $W_2$ shown in FIG. 4, it may be necessary to position a fourth camera 26 on stand $S_1$ to view the lower outer surface of the wheel. Two Helium-Neon lasers, 30 and 32, with line generators on the output beams are mounted above and below the wheel to produce vertical planes of laser light which intersect the upper inside surface and lower inside surface of the wheel perpendicular to the wheel's surface tangents. To minimize movement of the lasers after calibration, they are fixedly mounted to stand $S_3$ attached to the platform base 12. The second and third cameras 22, 24 are mounted on stand $S_2$ in such a way as to see past all mechanical fixtures and image the lines of light, in their respective fields of view, that appear on the inside wheel surfaces resulting from the lasers and optics. The angle of the second and third cameras 22, 24 relative to the wheel must be such that a continuous (but curved) line of light (intersection of the light plane with the inner contoured wheel surface) is observable in the image space of the cameras. The first camera 20 (and fourth camera 26, when used) senses or records the outside profile of the wheel (as contrasted with the backlit table fixture) at the exact position tangent to the outside wheel surface and perpendicular to the planes of laser light.

The image acquisition and measurements of this system are keyed to the jog/indexing mechanism, generally 40, which rotates the wheel around central axis of rotational symmetry C for the indexing mechanism 40. Multiple measurements are made at various positions of the wheel at each stop as controlled by this indexer 40. The specific types of measurements and measurement locations are keyed to the type of wheel being produced. When indexer 40 has fixed the wheel at each rotational stopping point or inspection position, the computer vision system is triggered to proceed with image capture, image processing, image analysis, object measurement, and dimensional gauging operations. Resulting data is thus captured for immediate display to the operator on the Inspection Computer Console, generally 50, in a visually comprehensible graphical format. This same data is also stored numerically for later analysis and interpretation. Specific measurement conditions and indications are calculated based on measurements taken and these are flagged and highlighted graphically on the display screen.

This process is repeated each time the indexer logs the wheel to a new position. For each wheel, a pass/fail determination can be made based on predetermined dimensional criteria established for each wheel type to be examined.

Figure 5:
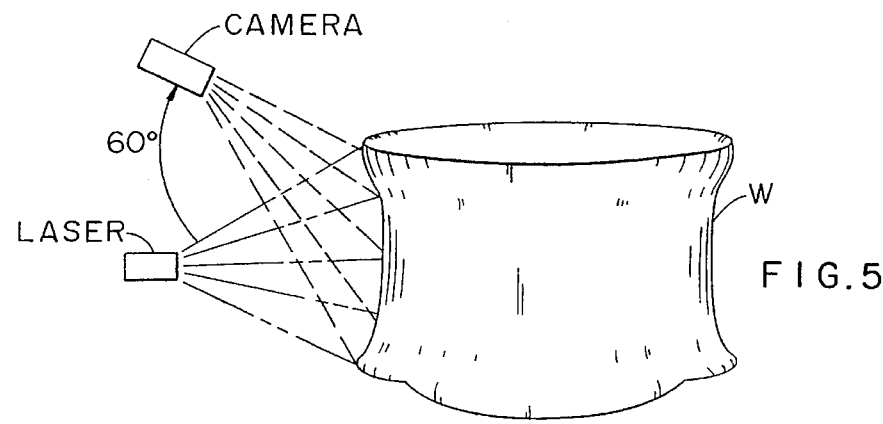
FIG. 5 is a schematic, perspective view showing an alternate arrangement for illuminating a wheel's outer profile.

To measure the various outer profile dimensions, i.e., diameters, heights, etc., of wheel, a preferred embodiment of this vision inspection system employs a background lighting source 60 as shown in FIG. 1. Although the backlight source 60 is shown as separately standing, it may also be incorporated onto platform 12 if spacing allows. In any event, the wheel is preferably positioned between this backlight source 60 and camera 20 (and camera 24) in order for the camera to see the light that is not stopped by the wheel, and generate a light/dark boundary indicating where the wheel's outer profile lies. In an alternative embodiment, the wheel outer geometry illumination may be accomplished by a separate colluminated laser as shown in FIG. 5. If a laser is used to light the outer surface, camera 20 would be positioned at an angle to the wheel to pick up the illumination of this laser on the wheel's outer surface.

Figure 6:
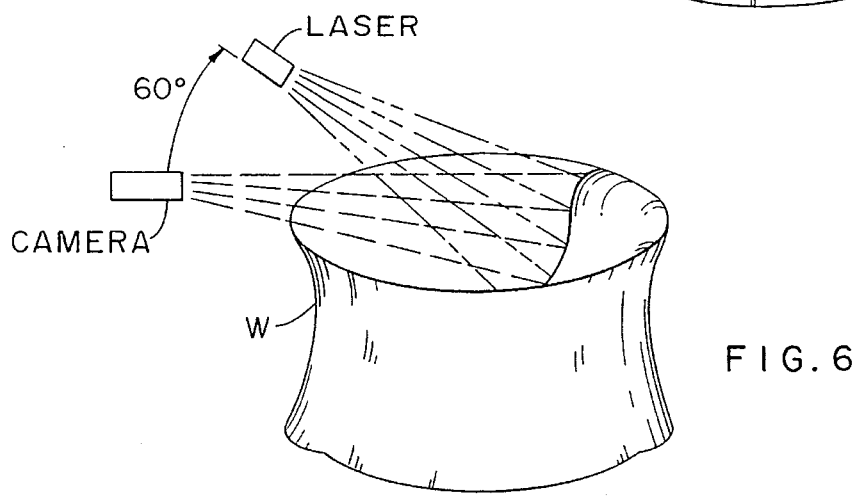
FIG. 6 is a schematic, perspective view showing the preferred embodiment for illuminating a wheel's inner profile.

FIG. 6 shows how the lasers and cameras of this invention illuminate and collect data about the wheel's inner geometry. A projecting or focused laser or other illumination system must be used since no backlighting can reach the inner surface of the wheel in any manner that allows the camera to see a specific surface, at least a portion of this surface, including all inner and outer curvatures thereof, in its entirety. The detecting camera is placed at an angle to the laser line to accurately view the curved line of illumination using triangulation techniques. The illumination and sensing of the wheel's lower inner surface is generally the same as that for its upper inner surface geometry shown in FIG. 6.

On a preferred basis, indexer 40 of the invention includes means for centering the wheel on finger-like supports 42. One embodiment of wheel centering means includes at least three hydraulically controlled pins 44 for centrally positioning the wheel on the indexer's supports 42 until substantially equal levels of hydraulic back pressure are asserted on each pin 44. For some wheel shapes, such as wheel $W_2$ shown in FIG. 4 and having no end wall, it may not be possible to readily position the wheel on the three finger-like supports of indexer 40. In those situations, an adapter A may be used to support the wheel $W_2$ on a flat wall within the wheel. The adapter A should not interfere substantially with the camera and laser readings of the wheel's inner surface profile.

In the accompanying Figures, the wheels inspected by this system are rested on the indexer's supports with the central, longitudinal axis of the wheel aligned vertically or normal to platform 12. It should be understood that a system for wheel inspection may also be assembled with an indexer whose wheel rotates with a horizontally-extending central axis with only minor modifications to the present system. An alternative embodiment could also move the lasers and/or cameras about a fixedly mounted wheel rather than move the wheel within fixed cameras and light sources. While this embodiment would be more expensive to operate, it is still feasible.

Figure 7:
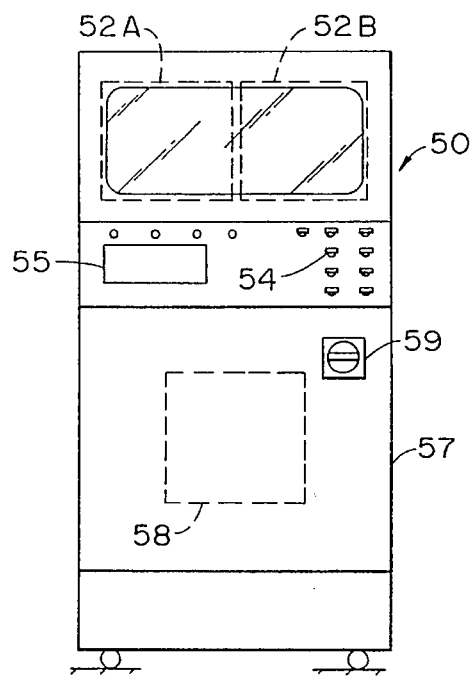
FIG. 7 is a front view of the system's inspection computer console.
Figure 8:
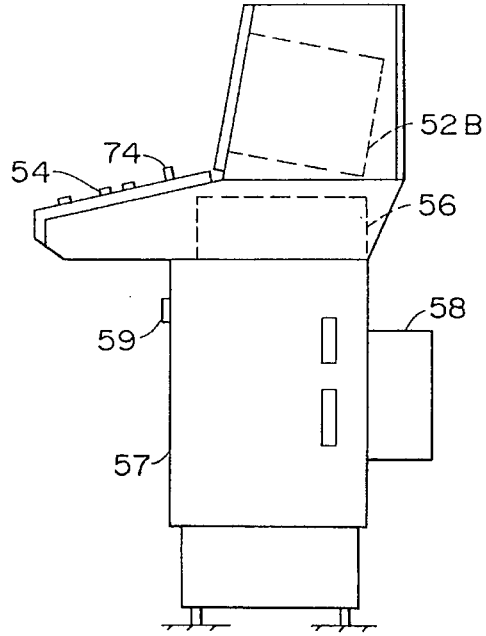
FIG. 8 is a right side view of the computer console show in FIG. 7.
Figure 9:
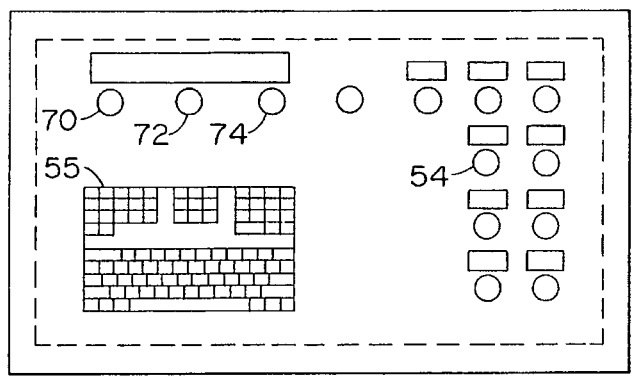
FIG. 9 is a top view of the control desk layout for the console shown in FIGS. 7 and 8.

FIGS. 7–9 show the operator interface to the system, or console 50 in greater detail. Console 50 includes two display monitors 52A and 52B, mounted side by side, a panel of large color-coded button-type switches 54, and a built-in full-function computer keyboard 55. The CPU 56 for this computer interface is housed within an environmentally protective structure 57 having a separate air conditioner 58 and master on/off switch 59. On the display panel, numerous switches and lights, labeled for easy operation, lead the operator through the wheel inspection process. Upon testing, the system's panel board illuminates a green light 70, amber light 72 or red light 74 to show whether the inspected wheel passes dimensional specifications 70, marginally meets the median data values 72, or fails 74, respectively.

The operator of this system interacts with applications software through a menu of choices. The menus are hierarchically structured for simplicity and ease of use. Only those choices relevant to the task at hand are offered on the menu. The menus and instructions appear on the left display screen 52A, which is a full color text/graphics monitor. This monitor is also used to view wheel profile graphics and data graphs and charts reflecting the results of gauging operations performed by the system. The live video images from the cameras and the captured and processed image data .from frame buffer are viewed in 8-bit grayscale format with color graphics overlays on the right side display screen. During the initial calibration process and inspection setup operations, the operator is requested to interact with the video that appears on monitor 52A by using the arrow keys on keyboard 55 to position a box or a cursor over certain video elements and indicate measurement locations or sizes of windows indicating areas of interest. During these phases of operation, the left screen indicates what the operator is to do, while the right screen provides a visual guideline (with grayscale video images) and interactive feedback (using color graphics overlays for window boundaries, cursor locations, etc.).

The system of the present invention preferably uses a computer based controller for processing the acquired video data and calculating, storing and displaying the various measurements and other information on the wheels undergoing inspection. Any available computer system having suitable speed, memory and computational capabilities to process the type and quantities of generated data can be used in the present system. An operational embodiment of the present vision inspection system includes an IBM compatible 80386 PC computer operating at 12 MHz and including a 1M Byte random access memory (RAM), a 3-½" floppy disk drive, a 5-¼" floppy disk drive, a 40M Byte hard disk drive, and EGA color graphics card and a keyboard. The computer is equipped with a vision interface board allowing for the capture and processing of image data generated by the cameras.

The system described above employs machine vision technology to perform non-contact, three dimensional gauging operations on substantially hollow cylindrical objects having at least one open end, an inner surface and an outer surface, and an object longitudinal axis extending therethrough. The system was specifically developed to inspect conventional vehicle wheels forged on a multi-section die, although other cylindrical objects can readily be inspected by using the same system and techniques. The machine vision subsystem of the present invention uses structured lighting and multiple video cameras based on CCD array sensor technology.

Figure 10:
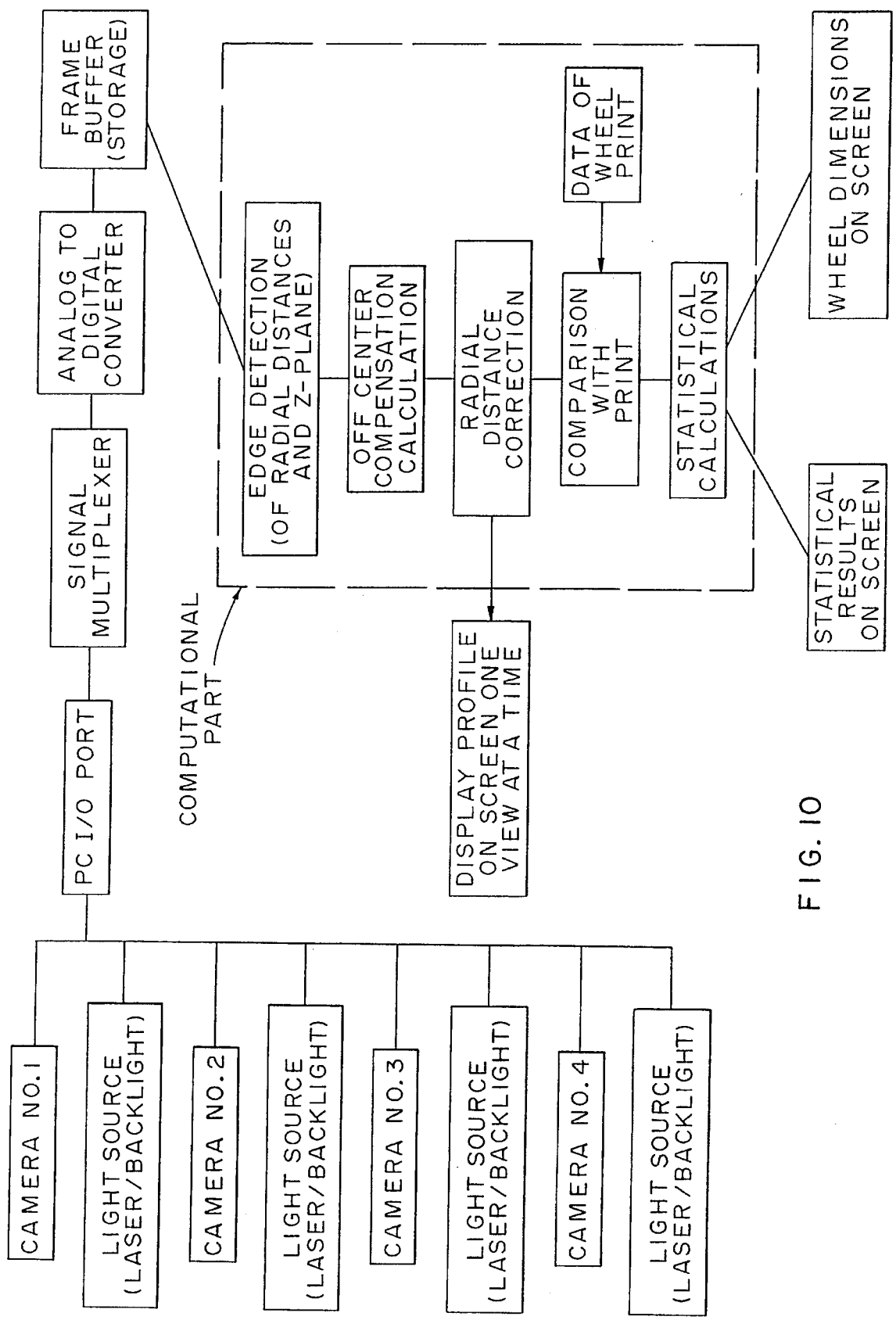
FIG. 10 is a block diagram showing the overall operation of the video processing portion of the present invention.
Figure 11:
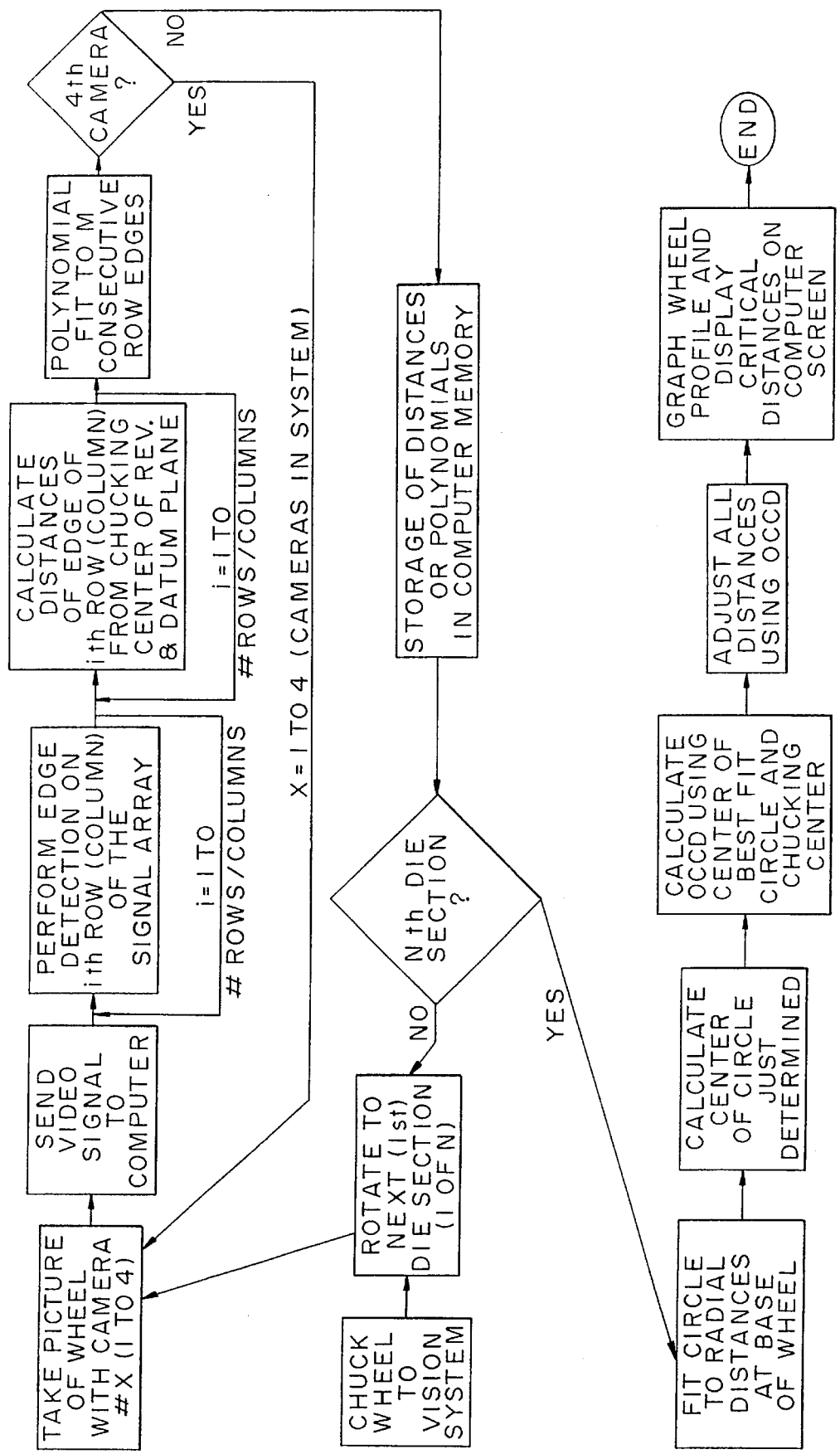
FIG. 11 is a flow chart of the data acquisition and computation aspects of the video processing portion of the present invention.

The overall operation of the system is shown in more detail in connection with the block diagram of FIG. 10 and the flow chart of FIG. 11. Data from the plurality of cameras is acquired and digitized in the form of images and these images are enhanced and processed by the imaging process subsystem to yield information about the shape and dimensions of the wheel. Transitions from various gray levels, as defined by specific algorithms, are used to define useful data about the edge of the observed object, e.g., a wheel. The data points or edges found in the images correspond to points on the cross-section or profile of the wheel. A geometric transformation is applied to the data points in image space to obtain the cross-section in wheel coordinates or inches. This geometric transformation is based on the physical relationship of the cameras to the wheel. Each camera has a different mapping from image space to wheel coordinate space depending upon its position and orientation relative to the wheel. These relationships are pre-calculated during a calibration procedure for the vision system. Once the data points are located in the wheel coordinate space, mathematically defined curves representing the forged surface of the wheel can be fit to the data. These curves can then be used to measure how close the forged surface of the wheel is to the reference points which represent the theoretical machined wheel surface. The structured lighting is provided by two 4–6 mW Helium-Neon lasers with attached optical line projectors. The optics on the front of each laser incorporate a cylindrical lens which takes a collimated beam of coherent light from the laser and spreads the intensity out perpendicular to the direction of the beam. This creates a planar beam of laser light that will illuminate the surface of the wheel with a bright red line of light where the wheel intersects the plane of illumination. As will be described hereinafter in more detail, this plane of light is oriented in an inspection plane which is perpendicular to a reference plane passing through the wheel and through the longitudinal axis of the indexer or support for the wheel. The lasers are mounted in a vertical tower to one side of the platform base 12. Laser 30 is mounted higher in the tower and tilted down toward the wheel and the laser 32 is mounted directly below and in the same tower, but tilted up toward the wheel. The optical line projectors on the lasers are adjusted such that the resulting planes of illumination are co-planar and vertical with respect to the platform base.

The first camera 20 and the fourth camera 26 of the system are mounted in a tower at one corner of the platform base 12. These cameras are mounted directly above one another, both facing toward the wheel. These cameras are used to view the outside profile of the wheel in a plane perpendicular to the view of the cameras. The wheel is positioned against a bright background, provided by a large area diffused fluorescent light source and a fixture fixed to the shop floor in front of the platform base 12. These cameras will observe the wheel as a very dark object in contrast to the light background. This arrangement allows the cameras to directly observe the shape of the wheel or its profile on the outer surface.

The second and third cameras 22, 24, are mounted in a separate wider tower that is mounted at an angle at another corner of the platform base 12. Each of these cameras is mounted on its own individually adjustable (tilt and swivel) head that is attached to a slotted crossbar mounted horizontally across the width of the tower. The second camera 22 is angled down into the wheel so that it has an unobstructed view of the laser line projected from the top laser 30 onto the inside surface of the wheel. The third camera 24 is angled up toward the bottom surface of the mounting flange of the wheel with the view of the laser line projected from the bottom laser 32. Both the second and third cameras 22, 24 have optical bandpass filters that are not included on the other cameras. Cameras 22, 24 are picking up a view of a red laser light while the other cameras 20, 26 are not. The lasers are tuned to produce coherent light with a wavelength of 632.8 nanometers and the optical filters attached to the second and third cameras 22, 24, are designed to pass light to the camera element at that specific wavelength. This configuration effectively blocks out all ambient light to cameras 22, 24, allowing the detection of a bright laser line against a dark background. This contrast in the images is used to determine the shape of the wheel as will be explained in more detail hereinafter.

The image acquisition function begins at sensor elements incorporated into the video cameras. Each sensor is an interline transfer CCD array that is sensitive to light intensity. Each sensor, or CCD array, is placed at the focal point so that the lens projects a clear image upon the surface of the array. The intensity of light that falls on the array elements determines the magnitude of the sensor output for the corresponding area of the image.. The CCD array has a scanning area of 6.4 mm×4.8 mm and has 570 horizontal elements by 485 vertical elements.

The outputs of the cameras are in the form of a composite video signal conforming to RS-170 specifications. As is shown more clearly in FIG. 10, the four channels of video output from the four cameras are provided to an input/output port of the computer system and are multiplexed to frame buffers so that any one of the four video signals can be instantly available for viewing live video or for image acquisition. All of the cameras are gen-locked to the same sync source so that the video signals are synchronized and stable. The master sync source is generated by one of the cameras and all the other cameras are gen-locked to that signal. The sync signal is daisy-chained throughout the system, feeding into the GENLOCK video input connector on each camera.

The first step in image processing of the acquired signals is to convert the analog signals into digital information that the computer can process more effectively. This conversion from analog video signal to digital image is often times referred to as "frame grabbing" or "image capture". The analog video signal is digitized in the discreet values that are associated with the light intensity of different areas of the image. The image is divided into an array of small areas called pixels that are arranged in a rectilinear grid pattern. Each pixel is assigned a value representing the intensity of the image at that position. There are eight bits of information stored for each pixel of the image. This allows a pixel to have an intensity value in the range 0 to 255 with 0 meaning dark (black) and 255 meaning bright (white). The pixel intensity values are otherwise known as "gray levels" because each different pixel value represents a different shade of gray.

When the acquired video signals are digitized into pixel values, these numbers are stored in a particular area of computer memory known as a frame buffer. The frame buffer used in the present system has a particular number of pixels arranged in rows and columns, namely, 484 rows and 512 columns of pixels, giving the frame buffer a resolution of 512 by 484. This means that each image has exactly 247,808 pixels and each of these pixels has 1 of 256 gray levels assigned to it. The number of rows of pixels in the image is also referred to as the vertical image resolution and the number of columns of pixels in the image is refered to as the horizontal image resolution.

The resolution power of each camera in the vision system depends on the image resolution as well as the size of the field-of-view of the camera. This field-of-view is determined by the optics (size of lens) and the distance of the wheel from the camera. The field-of-view is that area of the wheel or other object that can be observed by the camera. Only objects within the field-of-view can be detected and become part of the image. In the present system, the field-of-view is different for each camera. For a given fixed lens, the further away the camera is from the object, the more of the scene that can be viewed or imaged. These factors determine how much area in the scene is represented by each pixel of an image and, therefore, how small of an object or discrepancy in the scene is detectable by the vision system. In the present arrangement, the positioning of the cameras provides for a spatial resolution of about 0.02 inches.

Once the images are acquired by the system, they are analyzed by edge detection techniques to determine the outlines of the object within the scene. While there are many different techniques available to enhance and find objects within an acquired image, the present system was designed to present scenes of high contrast to the sensors with controlled lighting, which greatly enhances the ability of the system to detect object edges to a high degree of accuracy. With such a lighting operation in mind, the present invention uses gradient edge detection techniques to analyze the acquired data.

The differences between pixel gray levels and successive pixels in a row or column are referred to as gradients. The gradient is a measure of the change in intensity in a given direction. The images obtained by the cameras in the present system have a good contrast between the dark areas and the bright areas and the transition areas of the image that border the bright and dark areas are the object edges that are of interest. The gradient edge detection algorithm used in present invention analyzes an image in a given direction, such as row-by-row or column-by-column, and finds the pixel locations that show the greatest change in value or intensity along this direction. The pixel locations thus detected represent the border lines between dark areas and bright areas of the image.

For purposes of the first and fourth cameras 20 and 26, the wheel is in the foreground of view and the background is provided by the backlight. The aperture of the camera lens and the gain and .offset parameters therein are set as to make the foreground or wheel appear uniformly very dark and allow the background to remain uniformly very bright. The orientation of the cameras is such that the profile of the wheel extends across the image from left to right so that the bright area of the image is toward the top and the dark area of the image is toward the bottom. To find the edge of the wheel in the image, the gradient edge detection algorithm is applied by scanning the array from top to bottom, column-by-column.

With regard to the second and third cameras 22, 24, the image acquired by the cameras contains a relatively bright laser line against a dark background. The plane of the laser light is projected directly onto the wheel in the plane of the inspection. The second and third cameras 22, 24 are set at acute angles (between 30 and 75 degrees) with respect to the plane of inspection, so that the laser light appearing on the surface of the wheel forms a line in image space that is not straight. The collimated laser line conforms to the shape of the wheel. The aperture of the camera lenses and the gain and offset parameter are set to make the background or wheel appear very dark and allow the laser line to remain very bright. This is enhanced by the use of the optical filters in front of the second and third cameras 22, 24 as described hereinabove. The image and the frame buffer corresponding to the second camera 22 is scanned column-by-column from top to bottom, while the frame buffer corresponding to the third camera 24 is scanned row-by-row.

While the present system has been arranged to eliminate much noise which may interfere with the integrity of the signals detected by the cameras, noise can always be present in any carefully designed system. The present arrangement includes some additional techniques for reducing the effects of noise on its overall operation. One technique used in the present invention includes an extra parameter in the gradient edge detection algorithm referred to as a minimum gradient threshold for each camera in the vision system. This parameter provides a way of tolerating a degree of noise in the image without detecting a false edge. The minimum gradient threshold is a gradient value (difference between two gray levels) that is the smallest gradient that can be considered as a candidate for the maximum gradient in each column or row of pixels during evaluation. If all of the gradients in a column or row of pixels is below the minimum gradient threshold, then no edge is found for that row or column. This technique helps to ensure that the edges detected in image really represent the image that exists on the wheel.

In addition, the scanning algorithm techniques described above can be applied in two directions instead of just one. The scanning of the image, either column-by-column or row-by-row, is done first in a top to bottom direction and then again in the opposite direction. This scanning usually detects two different edges, particularly where the laser lines cover several pixels. This technique will find the top side of the laser line on the first scan, then find the bottom side of the laser line on the second scan. These two edge results are averaged together in the vertical direction or the horizontal direction to provide an edge result representing the middle of the laser line.

An additional technique used to increase the accuracy of edge detection, reduce the effects of noise on the results, and achieve sub-pixel resolution is to apply the algorithm multiple times on a sequence of images taken from the same sensor in rapid succession. The individual edge results from each image can then be averaged together to find the edges to a finer fraction of pixel resolution. This technique is effective at improving the effective image resolution of the overall system and has the advantages of reducing the effects of vibration, straight pixel values, aliasing, and noise on the edge results. This is accomplished by averaging out the influence of any of these factors have on any one individual image or frame required by the cameras.

A fundamental element of the present system is the use of the detected pixel arrays to acquire precise dimensional information about the edges of the object being detected. This is accomplished by defining known reference locations for one or more portions of the pixel arrays for each camera and assigning each fired pixel a distance with respect to their known frame of reference. Then all of the acquired image data from the different cameras are combined with respect to the same frame of reference to provide precise dimensional information on the wheel. In the present system, a planar frame of reference, also referred to as the datum or reference plane, is defined as a plane parallel to the platform base 12 and extending through the tops of the three supports 42 which hold the wheel. This plane contacts the outer base plane of the wheel. In addition, a reference axis of rotation is defined as the longitudinal axis which passes through the center of the indexer or support for the wheel. This axis is also referred to as the center of revolution of the chucking mechanism, because the wheel will always be positioned within the chucking mechanism and the three hydraulic pins 44 which position the wheel on the mechanism.

Figure 12:
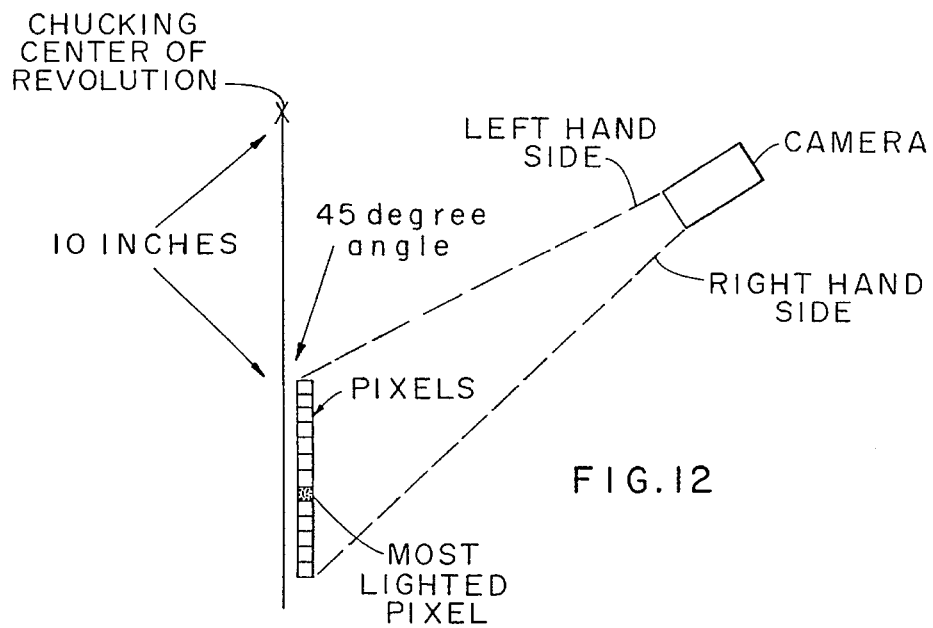
FIG. 12 is a schematic diagram showing how distances are determined from the camera pixel array.

By calibration techniques which will be described hereinafter in more detail, at least one pixel in the pixel array in the field-of-view of each camera is provided with a precise dimension with respect to the longitudinal axis of the support and also a precise dimension with respect to the datum or reference plane. By knowing the dimension of each individual pixel, as determined by the lens of the camera, the field-of-view and the spacing of the camera from the object, the pixel determined by edge techniques as the most lighted pixel in each row and/or column can be precisely located with respect to the reference plane and the support longitudinal axis. Therefore, each lighted pixel along the line of illumination of the edge of the object can be precisely dimensioned and located with respect to this established frame of reference. This is shown in more detail in connection with FIG. 12, which shows a camera and one column or row of its field-of-view. One of the pixels is fixed in this view and can be precisely dimensioned with respect to the chucking center of revolution. Similar calculations are performed for locating that pixel with respect to the datum reference plane. Since the camera shown in FIG. 12 is positioned at an angle with respect to the object, the distances must be modified in accordance with the sine of the angle of deviation, i.e., the sine of 45 degrees. For the first and fourth cameras which measure the profile of the camera, no sine modification need be made and the dimensions measured directly by the camera are used in the system.

Referring once again to FIGS. 10 and 11, the detected locations and dimensions for each edge acquired by each camera, are combined in a computer calculation or video image processor to determine the precise cross sectional dimensions of the wheel and its shape and configuration. These calculations are all made with respect to the chucking center of revolution and the datum or reference plane defined by the system. This calculation is repeated for each of the cameras used in the system and stored in memory for further calculations. During the inspection operation, the wheel is rotated by the indexer or support, stopping at each of a plurality of inspection positions to collect data from the vision sensors. At each of the inspection locations, for each camera, multiple images are acquired, pixel intensity gradient edge detection is performed and the results are averaged together to determine the profiles and laser lines to fractional pixel accuracy. As with the data acquisition step described above, these distances are all acquired and calculated with respect to the support center of revolution and the reference or datum plane.

Once inspection has been performed about the entire circumference of the wheel and at the predetermined inspection locations, then the acquired data can be combined together to locate radii or diameters of the wheel at various locations. It is preferred that inspection positions be spaced at regular intervals about the object, and pairs of inspection locations spaced 180 degrees apart can be readily used to obtain information on the various diameters of the wheel at that inspection location.

Figure 13:
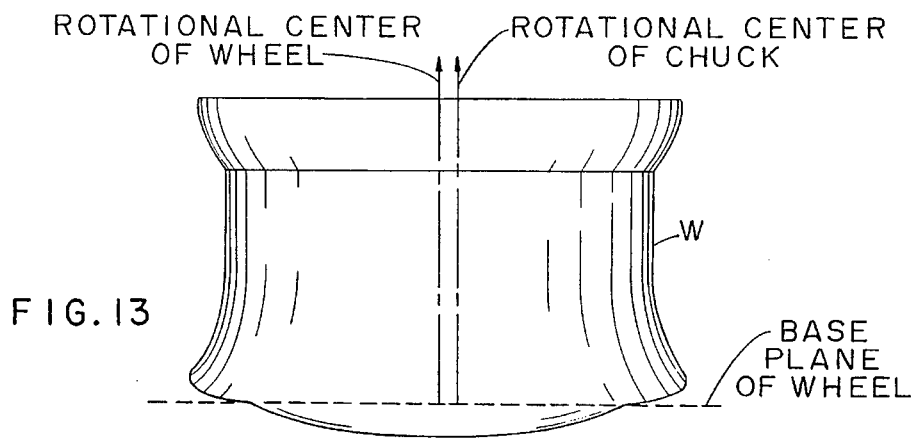
FIG. 13 is a side view of a wheel showing the off center compensation techniques of the present invention.

It is desirable to obtain information on the actual dimensions of the wheel with respect to its own longitudinal axis. The longitudinal axis of the wheel may not always line up with the rotational center of the chucking mechanism. This is shown more clearly in FIGS. 13 and 14, which show the offset that may occur in the system. The algorithm of the present invention compensates for this possible offset in the following manner. Once all of the data has been acquired on distances and configurations about the entire circumference of the wheel, the computer will use at least three of the inspection locations and draw an imaginary circle passing through the selected radial dimensions. FIG. 14 shows the use of six radial dimensions for purposes of example. A circle which best fits the measured wheel is drawn through these radial dimensions and then a radial center of that calculated or imaginary circle is determined. The system can readily compute both the magnitude and the direction of any deviation of the true wheel center from the rotational center of the chucking mechanism. Thereafter, each of the acquired dimensional signals are appropriately adjusted in a vector operation which considers both the magnitude and the direction of the radial difference. This is repeated for each inspection plane and thereafter an accurate and true picture of the wheel can be drawn.

In certain areas of the wheel or other object under inspection, resolution of the measured edges to pixel width accuracy is not completely acceptable. In these areas, it is desirable to use polynomial mathematical fitting techniques to smooth the data to fit a surface which is known to be physically non-linear. This is shown in more detail in connection with FIG. 15. The polynomial equations, which are known in the art, calculate from the data received, wheel profile information along both the x and y axes of the camera pixel matrixes employed therewith. When a smooth curve is fitted through the points or the detected edges, the true wheel surface can be approximated. This method improves accuracy and enables the vision system to determine the wheel dimension at any given point with more accuracy than by using individual pixels alone.

All of the measurements made by the present system are derived from sensor data acquired by the vision system. The accuracy of these measurements is critically dependent upon knowing the spatial relationship between the sensors and the wheel undergoing inspection. This spatial relationship is described in terms of a set of numbers and mathematical equations. The numbers are referred to as calibration parameters and they are calculated during a calibration procedure prior to initial inspection of any wheel. The spatial relationship between the sensors (video cameras) and the wheel is a three-dimensional geometric situation. These three-dimensions in the present arrangement are provided by: (1) the longitudinal axis extending through the support, otherwise referred to as the chucking center of revolution; (2) the datum or reference plane passing through the supports for the wheel; and (3) the plurality of inspection locations as the wheel is rotated during the inspection process. In general, there are no specific constraints on the exact position or orientation of each camera, as long as the camera remains fixed and spaced relative to the chucking coordinate space. However, once the cameras are set into position and securely fixed in space, a calibration procedure may then be used to establish precise relationships between the cameras and chucking coordinate space. After calibration, the cameras must remain fixed in space to obtain accurate dimensional measurement data on the wheels. The system can be programmed to move multiple cameras and/or lasers to a plurality of fixed positions for measuring different wheel models.

One arrangement developed for calibrating the present system is the use of a calibration gauge block. This calibration gauge block is a physical structure that can be loaded into the system in the fixture where a wheel would normally be placed for inspection. The calibration gauge block has no moving parts and is a permanently assembled structure built to very precise dimensions. The primary features of the calibration gauge block are a heavy steel disk, a top mounted plexiglass dot field, and a bottom mounted plexiglass dot field. The plexiglass dot fields are mounted to the disk by heavy duty angle brackets that are both bolted and pinned into place. The calibration gauge block also has three eye-hooks at the periphery of the disk to assist in lifting and loading it .into the jib crane.

The calibration gauge block is designed to provide known points and dimensions at the inspection plane that can be observed by the sensors (video cameras) and correlated with the image space of each camera. This is the purpose of the black dots and the white plexiglass background. The black dots are positioned on one-inch centers. The rows of black dots are parallel with the bottom face of the disk and are integer distances (in inches) away from the bottom surface of the disk. The top field of dots is aligned on the same one-inch centered grid as the bottom field of dots. Therefore, when the calibration block is loaded into the system properly and aligned with the plane of inspection, the dot fields represent in an area of the wheel coordinate system. The area of wheel coordinates spaced to be calibrated extends above and below the datum plane (defined by the three top surfaces of the wheel support pieces on which the wheels rest when loaded) and also to the left and right (radially in and out from center) of where the wheel cross-section is in the plane of inspection. The cameras will be looking at different, sometimes overlapping, areas of this dot field pattern during calibration and establishment of a specific field-of-view. By knowing where the dots are relative to the wheel fixture and observing where they appear in the image space of each camera, the precise dimensional relationship between wheel coordinate space and the image space can be established and used in later inspection calculations.

FIG. 16 is a cross section through a portion of a forged metal wheel and illustrates how the data acquired by the present system can be used to conduct quality control analyses on a particular wheel. FIG. 16 also shows how this wheel would have been positioned with respect to the datum reference plane and also the center line of the support or chucking mechanism. For purposes of FIG. 16, it is assumed that the center line of the support is aligned with the longitudinal axis through the wheel and that any off center compensation has been calculated. FIG. 16 also shows, in phantom lines, the outline of the finally finished wheel which will be manufactured from the forged wheel defined by the outer solid curve. One of the goals of the present system is to make sure that the forged wheel has enough material and is of the proper shape and dimension to enable the final wheel to be machined therefrom.

A determination of whether the forged wheel is acceptable or not is made by looking at the dimensions of the wheel at the various locations identified on FIG. 16. Firstly, the outer bead seat of the wheel is inspected by: (i) height measurement 1 with respect to the datum plane; and (ii) a radius inspection at point B with respect to the center line. The inside bead seat of the wheel is inspected using: (i) height measurement 2 with respect to the datum plane; and (ii) the radius measurement at location A with respect to the center line. The mounting flange or face of the wheel is inspected by measurement 5 from the datum plane to the outer surface of the mounting flange and also the width measurement of the flange itself at measurement 3. It can be appreciated that measurement 3 is actually a calculated measurement which takes the physical measurement at location 5 and subtracts it from a separate measurement from the datum plane to the inner face of the forged wheel which is detectable by the sensor system described hereinabove. In addition, the inside wheel diameter is inspected at location 4 which is actually a combination of radial measurements with respect to the center line at locations spaced 180 degrees apart on the wheel. Locations C and D are examples of other locations of concern on the wheel. Initially, radial measurements are taken at locations C and D to determine the proper diameter of the wheel at those locations. In addition, the measurement at locations A, B, C and D are also compared with respect to the desired finished wheel, which is shown in phantom on FIG. 16, to determine whether there is sufficient material at those locations to provide for the proper machining. This is referred to as an excess metal measurement and is categorized as a finish allowance tolerance for the forged wheel with respect to the finished wheel.

For all of the measurements shown in FIG. 16 above, which happen to be particularly critical for that wheel and may be different for other wheels, the computer system can be automatically programmed to provide indications of whether the forged wheel is within or outside of acceptable tolerances for both the forged wheel and the desired finished wheel. Information on both the final forged wheel, the final finished wheel, and acceptable degrees of tolerance for the wheels at various locations are supplied to the memory in the computer and are compared against the actual measured wheel during the inspection process. In addition, the system can readily keep track of statistical information on a plurality of wheels undergoing test and report trends of the wheel with respect to deviations from acceptable tolerances and also provide indications of trouble which may be developing in the forging process or other areas of the manufacturing process. These statistical results can be stored in memory for later use and can also be displayed on the computer screens for ready access by the operator.

Having described the presently preferred embodiments, it is to be understood that the invention may be otherwise embodied by the scope of the claims appended hereto.

We claim:

1. Method for contactlessly measuring the shape and cross sectional dimensions of a substantially hollow cylindrical object having at least one open end, an inner surface and an outer surface, and having an object longitudinal axis extending therethrough, said method comprising the steps of:

a) positioning said object on a support which defines a support longitudinal axis extending parallel to said object longitudinal axis, said support also defining a reference plane at a known location and extending perpendicular to said support longitudinal axis;

b) illuminating at least a portion of the outer surface of said object along an outer line in a first inspection plane extending perpendicular to said reference plane and through said support longitudinal axis at a first inspection position on said object;

c) detecting the illumination on said object along said outer line and, in response thereto, generating a first location signal representing the locations of said portion of the outer surface of said object along said outer line with respect to said support longitudinal axis and said reference plane;

d) illuminating at least a portion of the inner surface of said object through said open end along an inner line in said first inspection plane;

e) detecting the illumination on said object along said inner line and, in response thereto, generating a second location signal representing the locations of said portion of the inner surface of said object along said inner line with respect to said support longitudinal axis and said reference plane; and f) combining said first location signal and said second location signal with respect to said support longitudinal axis and said reference plane and generating a cross section signal representing the dimensions of at least a portion of said object between said outer surface and said inner surface at said first inspection position.

2. The method of claim 1 wherein steps b–f are repeated at a plurality of inspection positions spaced about said object.

3. The method of claim 2 wherein said inspection positions are spaced at regular intervals about said object.

4. The method of claim 2 further including the step of sequentially rotating said support about said support longitudinal axis to each inspection position.

5. The method of claim 1 wherein said object includes an end surface and said method further includes the steps of:

g) illuminating at least a portion of the end surface of said object along an end line in said first inspection plane;

h) detecting the illumination on said object along said end line and, in response thereto, generating a third location signal representing the locations of said portion of the end surface of said object along said end line with respect to said support longitudinal axis and said reference plane; and i) combining said third location signal with said first and second location signals with respect to said support longitudinal axis and said reference plane for generating said cross section signal.

6. The method of claim 5 wherein steps b–i are repeated at a plurality of inspection positions spaced about said object.

7. The method of claim 6 wherein said inspection positions are spaced at regular intervals about said object.

8. The method of claim 6 further including the step of sequentially rotating said support about said support longitudinal axis to each inspection position.

9. The method of claim 2 further including the step of generating, at each inspection position, a radial signal representing radial dimensions of at least a portion of said object with respect to said support longitudinal axis.

10. The method of claim 9 further including the steps of selecting a radial dimension of said object at the same object location in at least three of said inspection positions, determining the radial center of an imaginary circle passing through said selected radial dimensions, determining a radial difference between the support longitudinal axis and said radial center, and adjusting the location signals, cross section signals and radial signals in a vector operation which considers the magnitude and direction of said radial difference in each inspection plane.

11. The method of claim 1 wherein the outer surface of said object is illuminated by a backlight spaced from said inspection plane.

12. The method of claim 1 wherein the outer surface of said object is illuminated by a collimated laser.

13. The method of claim 1 wherein the inner surface of said object is illuminated by a first laser projecting a line of laser light along said inner line.

14. The method of claim 5 wherein the inner surface of said object is illuminated by a first laser projecting a line of laser light along said inner line and wherein the end surface of said object is illuminated by a second laser projecting a line of laser light along said end line.

15. The method of claim 14 wherein said lasers are each Helium Neon lasers having a line generator on the output laser beams.

16. The method of claim 5 wherein the illumination on said object along said outer line, inner line and end line is detected by a first video camera, a second video camera, and a third video camera, respectively, and wherein said location signals are generated by an electronic video image processor receiving an output signal from each of said video cameras.

17. The method of claim 16 wherein said video cameras are charge coupled device cameras.

18. The method of claim 16 wherein each video camera generates a two dimensional pixel array representing the light intensity of the object detected by the camera, wherein the video image processor conducts a row-by-row evaluation of each pixel array and determines which pixels, if any, in each row represent illumination detected on said object, and wherein the video image processor assigns to each of said pixels representing said detected illumination a precise location with respect to said support longitudinal axis and said reference plane.

19. The method of claim 18 wherein the video processor evaluates each pixel array by an edge detection technique.

20. The method of claim 18 wherein a plurality of pixel arrays are averaged together for each video camera prior to evaluation by the video image processor.

21. The method of claim 18 wherein the video image processor, after it has determined which pixels in each row represent said detected illumination, uses polynomial mathematical techniques to generate a precise curve through the pixels representing the detected illumination and corresponding to the associated surfaces of said object.

22. The method of claim 1 wherein said object is a vehicle wheel.

23. The method of claim 1 wherein said object is a forged aluminum wheel.

24. The method of claim 2 further including the steps of comparing said location signals and cross section signals actually generated from said object with predetermined standards for said object, and then determining whether said object is within acceptable tolerances for said predetermined standards.

25. The method of claim 16 wherein each video camera generates a two dimensional pixel array representing the light intensity of the object detected by the camera, wherein the video image processor conducts a column-by-column evaluation of each pixel array and determines which pixels, if any, in each column represent illumination detected on said object, and wherein the video image processor assigns to each of said pixels representing said detected illumination a precise location with respect to said support longitudinal axis and said reference plane.

26. The method of claim 25 wherein the video processor evaluates each pixel array by an edge detection technique.

27. The method of claim 25 wherein a plurality of pixel arrays are averaged together for each video camera prior to evaluation by the video image processor.

28. The method of claim 25 wherein the video image processor, after it has determined which pixels in each column represent said detected illumination, uses polynomial mathematical techniques to generate a precise curve through the pixels representing the detected illumination and corresponding to the associated surfaces of said object.

29. Apparatus for contactlessly measuring the shape and cross sectional dimensions of a substantially hollow cylindrical object having at least one open end, an inner surface and an outer surface, and having an object longitudinal axis extending therethrough, said apparatus comprising:

a) means for positioning said object on a support defining a support longitudinal axis extending parallel to said object longitudinal axis, said support also defining a reference plane at a known location and extending perpendicular to said support longitudinal axis;

b) first illumination means for illuminating at least a portion of the outer surface of said object along an outer line in a first inspection plane extending perpendicular to said reference plane and through said support longitudinal axis at a first inspection position on said object;

c) first detection means for detecting the illumination on said object along said outer line and first generation means for generating, in response to said first detection means, a first location signal representing the locations of said portion of the outer surface of said object along said outer line with respect to said support longitudinal axis and said reference plane;

d) second illumination means for illuminating at least a portion of the inner surface of said object through said open end along an inner line in said first inspection plane;

e) second detection means for detecting the illumination on said object along said inner line and second generation means for generating, in response to said second detection means, a second location signal representing the locations of said portion of the inner surface of said object along said inner line with respect to said support longitudinal axis and said reference plane; and f) first processor means for combining said first location signal and said second location signal with respect to said support longitudinal axis and said reference plane and generating a cross section signal representing the dimensions of at least a portion of said object between said outer surface and said inner surface at said first inspection position.

30. The apparatus of claim 29 further including means for measuring said object at a plurality of inspection positions spaced about said object.

31. The apparatus of claim 30 wherein said inspection positions are spaced at regular intervals about said object.

32. The apparatus of claim 30 further including means for sequentially rotating said support about said support longitudinal axis to measure said object at each of said inspection positions.

33. The apparatus of claim 29 wherein said object includes an end surface and said apparatus further includes:

g) third illumination means for illuminating at least a portion of the end surface of said object along an end line in said first inspection plane;

h) third detection means for detecting the illumination on said object along said end line and third generation means for generating, in response to said third generation means, a third location signal representing the locations of said portion of the end surface of said object along said end line with respect to said support longitudinal axis and said reference plane; and i) second processor means for combining said third location signal with said first and second location signals with respect to said support longitudinal axis and said reference plane for generating said cross section signal.

34. The apparatus of claim 33 further including means for measuring said object at a plurality of inspection positions spaced about said object.

35. The apparatus of claim 34 wherein said inspection positions are spaced at regular intervals about said object.

36. The apparatus of claim 34 further including means for sequentially rotating said support about said support longitudinal axis to each inspection position.

37. The apparatus of claim 30 further including means for generating, at each inspection position, a radial signal representing radial dimensions of at least a portion of said object with respect to said support longitudinal axis.

38. The apparatus of claim 37 further includes means for selecting a radial dimension of said object at the same object location in at least three of said inspection positions, means for determining the radial center of an imaginary circle passing through said selected radial dimensions, means for determining a radial difference between the support longitudinal axis and said calculated radial center, and means for adjusting the location signals, cross section signals and radial signals in a vector operation which considers the magnitude and direction of said radial difference in each inspection plane.

39. The apparatus of claim 29 wherein said first illumination means is a backlight spaced from said inspection plane.

40. The apparatus of claim 29 wherein said first illumination means is a collimated laser.

41. The apparatus of claim 29 wherein said second illumination means is a first laser projecting a line of laser light along said inner line.

42. The apparatus of claim 33 wherein said second illumination means is a first laser projecting a line of laser light along said inner line and wherein said third illumination means is a second laser projecting a line of laser light along said end line.

43. The apparatus of claim 42 wherein said lasers are each Helium-Neon lasers having a line generator on the output laser beams.

44. The apparatus of claim 33 wherein the said first detection means, second detection means and third detection means are a first video camera, a second video camera, and a third video camera, respectively, and wherein said first, second and third generation means is a video image processor which receives the output signals of said video cameras.

45. The apparatus of claim 44 wherein said video cameras are charge coupled device cameras.

46. The apparatus of claim 44 wherein each video camera generates a two dimensional pixel array representing the light intensity of the object detected by the camera, wherein the video image processor includes means for conducting a row-by-row evaluation of each pixel array and for determining which pixels, if any, in each row represent illumination detected on said object, and wherein the video image processor includes means for assigning to each of said pixels representing said detected illumination a precise location with respect to said support longitudinal axis and said reference plane.

47. The apparatus of claim 46 further including means in said video image processor for evaluating each pixel array by an edge detection technique.

48. The apparatus of claim 46 further including means for averaging a plurality of pixel arrays for each video camera prior to evaluation by the video image processor.

49. The apparatus of claim 46 wherein the video image processor includes means for using polynomial mathematical techniques to generate a precise curve through the pixels representing the detected illumination and corresponding to the associated surfaces of said object.

50. The apparatus of claim 29 wherein said object is a vehicle wheel.

51. The apparatus of claim 29 wherein said object is a forged aluminum wheel.

52. The apparatus of claim 30 further including means for comparing said location signals and cross section signals generated from said object with predetermined standards for said object and means for determining whether said object is within acceptable tolerances for said predetermined standards.

53. The apparatus of claim 44 wherein each video camera generates a two dimensional pixel array representing the light intensity of the object detected by the camera, wherein the video image processor includes means for conducting a column-by-column evaluation of each pixel array and for determining which pixels, if any, in each column represent said detected illumination on said object, and wherein the video image processor includes means for assigning to each of said pixels representing said detected illumination a precise location with respect to said support longitudinal axis and said reference plane.

54. The apparatus of claim 53 further including means in said video image processor for evaluating each pixel array by an edge detection technique.

55. The apparatus of claim 53 further including means for averaging a plurality of pixel arrays for each video camera prior to evaluation by the video image processor.

56. The apparatus of claim 53 wherein the video image processor includes means for using polynomial mathematical techniques to generate a precise curve through the pixels representing the detected illumination and corresponding to the associated surfaces of said object.

* * * * *